United States Patent [19]
Yamazaki et al.

[11] Patent Number: 6,165,580
[45] Date of Patent: Dec. 26, 2000

[54] OPTICAL RECORDING MEDIUM

[75] Inventors: Mikio Yamazaki; Toshiyuki Kanno, both of Kawasaki, Japan

[73] Assignee: Fuji Electric Co., Ltd., Kanagawa, Japan

[21] Appl. No.: 09/188,285

[22] Filed: Nov. 9, 1998

[30]  Foreign Application Priority Data

Nov. 11, 1997 [JP] Japan ................................ 9-308973

[51] Int. Cl.$^7$ ..................................................... B32B 3/02
[52] U.S. Cl. ...................... 428/64.1; 428/64.4; 428/64.8; 428/457; 428/913; 430/270.14; 430/270.18; 430/495.1; 430/945; 369/283; 369/288
[58] Field of Search .................................. 428/64.1, 64.2, 428/64.4, 64.8, 457, 913; 430/270.14, 270.15, 270.18, 270.2, 495.1, 945; 369/283, 288

[56]  References Cited

U.S. PATENT DOCUMENTS

| | | |
|---|---|---|
| 2,112,139 | 3/1938 | Brooker et al. . |
| 2,734,900 | 2/1956 | Heseltine . |
| 2,887,479 | 5/1959 | Heseltine . |
| 4,656,121 | 4/1987 | Sato et al. . |
| 5,271,979 | 12/1993 | Santoh et al. . |
| 5,817,388 | 10/1998 | Hurditch ................................ 428/64.1 |
| 5,879,772 | 3/1999 | Morishima et al. .................... 428/64.1 |
| 5,976,658 | 11/1999 | Tomizawa ............................... 428/64.1 |

FOREIGN PATENT DOCUMENTS

| | | |
|---|---|---|
| 0 305 054 | 3/1989 | European Pat. Off. . |
| 0 347 183 | 12/1989 | European Pat. Off. . |
| 0 467 716 | 1/1992 | European Pat. Off. . |
| 0 840 307 | 5/1998 | European Pat. Off. . |
| 0 860 821 | 8/1998 | European Pat. Off. . |
| 56-46221 | 4/1981 | Japan . |
| 57-11090 | 1/1982 | Japan . |
| 57-66541 | 4/1982 | Japan . |
| 57-82094 | 5/1982 | Japan . |
| 57-82095 | 5/1982 | Japan . |
| 59-24692 | 2/1984 | Japan . |
| 59-124894 | 7/1984 | Japan . |
| 59-203247 | 11/1984 | Japan . |
| 60-44389 | 3/1985 | Japan . |
| 60-71296 | 4/1985 | Japan . |
| 61-290092 | 12/1986 | Japan . |
| 62-432 | 1/1987 | Japan . |
| 62-201288 | 9/1987 | Japan . |
| 62-201289 | 9/1987 | Japan . |
| 63-1594 | 1/1988 | Japan . |
| 63-168201 | 7/1988 | Japan . |
| 63-218398 | 9/1988 | Japan . |
| 1-40389 | 2/1989 | Japan . |

(List continued on next page.)

OTHER PUBLICATIONS

"Write Once Read Multiple (WORM) Optical Disk that Meets the CD Standards Ensures Recording Due to Thermal Deformation of the Critical Surface Between in Substrate and a Pigment Layer" Nikkei Electronics, vol. No. 445 (Jan. 23, 1989).

*Primary Examiner*—Elizabeth Evans
*Attorney, Agent, or Firm*—Venable; Robert J. Frank; Ashley J. Wells

[57] ABSTRACT

An optical recording medium includes a substrate having light transmission properties, which has laminated on a main surface thereof a recording layer and a metal reflection layer. The recording layer is made of a compounded organic dye thin film which contains a specified aromatic amine compound in an amount of not smaller than 3% by weight but below 30% by weight based on the total weight of the recording layer and a specified asymmetric cyanine dye having absorption to light having a wavelength of 500 to 700 nm in an amount of not smaller than 30% by weight but below 97% by weight based on the total weight of the recording layer. The recording layer is applicable to a short-wavelength (500 to 700 nm) semiconductor laser so that an optical recording medium according to the DVD-ROM standards having excellent stability of the dye film and allowing a decrease in jitter component upon high density recording.

7 Claims, 3 Drawing Sheets

OTHER PUBLICATIONS

| | | |
|---|---|---|
| 1-178494 | 7/1989 | Japan . |
| 2-87341 | 3/1990 | Japan . |
| 5-38879 | 2/1993 | Japan . |
| 5-67352 | 3/1993 | Japan . |
| 5-139047 | 6/1993 | Japan . |
| 6-40162 | 2/1994 | Japan . |
| 6-199045 | 7/1994 | Japan . |
| 6-320869 | 11/1994 | Japan . |
| 6-338059 | 12/1994 | Japan . |
| 7-4981 | 1/1995 | Japan . |
| 7-44904 | 2/1995 | Japan . |
| 7-52544 | 2/1995 | Japan . |
| 7-156550 | 6/1995 | Japan . |
| 7-161069 | 6/1995 | Japan . |
| 7-186530 | 7/1995 | Japan . |
| 7-251567 | 10/1995 | Japan . |
| 7-262604 | 10/1995 | Japan . |
| 7-262611 | 10/1995 | Japan . |
| 7-309069 | 11/1995 | Japan . |
| 8-99467 | 4/1996 | Japan . |
| 8-306074 | 11/1996 | Japan . |

OPTICAL RECORDING MEDIUM

This application is based on application Ser. No. 308, 973/1997 filed Nov. 11, 1997 in Japan, the content of which is incorporated hereinto by reference.

BACKGROUND OF THE INVENTION

1. Field of the Invention

The present invention relates to an optical recording medium, which is capable of performing recording and readout using short-wavelength laser beam. More particularly, it relates to a write-once type optical recording medium having excellent sensitivity and reliability according to the DVD-ROM standard, which is capable of high-density recording and readout of information by irradiation of a laser beam with a decreased beam diameter using an organic dye thin film whose light reflectance changes with short-wavelength laser beam.

2. Description of the Related Art

Optical recording mediums capable of recording have come into wide use. The optical recording medium has a feature that the recording medium does not cause wear deterioration because a writing (recording) or reading (readout) head is of a non-contact type. Furthermore, the optical recording medium has attracted much attention and has been developed as a large-capacity information carrier because the writing density can be extremely increased by decreasing a spot size of optical beam.

The recording and readout of the optical recording medium are performed as follows. For example, the recording can be performed by condensing laser beam in a recording layer, converting said laser beam into heat energy and changing the properties of the recording film by melting, decomposition, removing, etc. (to form a deformed layer pit or recording it 6 in FIGS. 1 to 3 below), whereas the readout can be performed by a change in amount of reflected light as compared with the unrecorded portion.

As the recording layer, a film of a chalcogenide metal represented by a tellurium alloy was put into practice at first. However, the chalcogenide metal film is disadvantageous in that it is harmful to humans, it formation involves a dry method which suffers high production costs and it is difficult therewith to meet an increasing demand for higher density recording. Therefore, proposals and reports about a medium using a recording layer containing an organic dye as a main component have been increased. This is because although the recording medium composed mainly of an organic dye has a lower reflectivity than metal, it has various excellent properties: (1) a recording layer can be made by forming a thin film using a low-cost wet method represented by a spin-coating method, although the reflectance is lower than that of the metal; (2) it is not corroded because of its excellent oxidation resistance; (3) recording pits with sharp shapes can be formed since it has a lower heat conductivity than metals and, hence more localized heating is possible.

On the structure of media, there have been made various proposals, e.g., a so-called air sandwiched structure obtained by providing an air layer on a recording layer of a generally used dye film and an optical recording medium capable of obtaining a readout signal corresponding to the CD standards. These structures are described in Japanese Patent Application Publication No. 3-759343, Japanese Patent Application Laid-open No. 2-87341, Japanese Patent Application Laid-open No. 5-67352 and Nikkei Electronics No. 469, page 107, Jan. 23, 1989.

In the optical recording disc in accordance with the CD standards, for example, there are known those discs obtained by forming a light absorption layer of an organic dye on a light transmitting resin substrate, forming a light reflection layer represented by Au directly or via a hard layer thereon and forming a resin protective layer on this light reflection layer. The light reflection layer is formed because a high reflectance of 65% or more can not be obtained by using only the organic dye film.

Irradiation of a laser beam to this disc allows the organic dye layer to absorb light so that it is molten or decomposed and, at the same time, the substrate is softened and the dye is mixed with the substrate at the interface. Finally, there is formed a recorded pit whose interface is deformed. In the deformed layer pit thus formed, the light reflectance varies with the light phase difference and reading can be performed similarly to CD.

As the organic dye layer of this optical disc, there are known, for example, squarilium dyes (Japanese Patent Application Laid-open Nos. 56-46221, 63-218398, 1-178494, 5-139047 and 7-44904), naphthoquinone dyes (Japanese Patent Application Laid-open Nos. 61-290092, 62-432, 63-168201 and 5-139047), azo dyes (Japanese Patent Application Laid-open Nos. 7-161069, 7-251567 and 8-99467), phthalocyanine dyes (Japanese Patent Application Laid-open Nos. 57-82094, 57-82095, 7-156550, 7-16068 and 7-52544) and cyanine dyes represented by the following general formula (III) (Japanese Patent Application Laid-open Nos. 59-24692, 2-87341, 6-320869, 6-338059, 6-199045, 7-262611, 62-201288 and Japanese Patent Application Publication 7-4981).

(III)

Wherein $R^{15}$ and $R^{16}$ independently represent an alkyl group, an aryl group or an alkoxyl group; $Y^3$ and $Y^4$ independently represent a halogen atom, a hydrogen atom, an alkyl group, an alkoxyl group, an aryl group, an alkoxysulfonyl group, a sulfonylalkyl group or a cyano group; $Q^1$ and $Q^2$ independently represent a sulfur atom, an oxygen atom, a selenium atom or an ethylene group; Z is an anion; and p and q are independently an integer.

Among the above dyes, cyanine dyes are mainly used in view of the sensitivity, C/N ratio, thermal properties, ease of converting into a thin film, etc. Particularly, the cyanine dyes are generally dyes having absorption and reflectance at a semiconductor laser wavelength of about 780 to 830 nm are used so that the resulting recording medium can be in accordance with the CD standards. It is known there is the length of π conjugated system as one of factors that determine the absorption wavelength of a molecule. Those cyanine dyes with a methylene chain in the central part of a cyanine dye molecule having absorption near 780 to 830 nm are generally those cyanine dyes which are represented by general formula (III) wherein the number, p, of methylene chains in the center of the molecular structure is generally 2 (i.e., p=2 in the general formula (III)). However, the cyanine dyes having two methylene chains have a fatal problem that they cannot be applied to short-wavelength laser. Furthermore, it is considered that the cyanine dyes represented by the general formula (III) have problems about readout deterioration, long-term stability of the film, C/N ratio, jitter component, etc. Reasons for the above are (i) that heat accumulation arises in the recording layer by a long-term exposure to reading light and the dye itself is deteriorated and discolored, (ii) that the reading light is absorbed at the interface of the recording layer where the deformed layer portion and non-recorded portion should be discriminated one from the other so that the melting or heat deformation arises slowly, and in addition distortion of the contour of the deformed layer pit arises simultaneously due to the similar heat accumulation, (iii) that when it is excited, the dye is oxidatively deteriorated (discolored) due to singlet oxygen which is generated due to transfer of energy from the dye to oxygen in the atmosphere, (iv) that as the phenomenon of deterioration after a long-term storage, there occur variation in the transmittance of a cyanine dye and generation of noises as a result of photo-deterioration of the dye film by natural light and read-out light as well as oxidation of the dye by oxygen or moisture and association or agglomeration of the dye molecules. To solve these problems, various proposals have hitherto been made (cf., e.g., Japanese Patent Application Laid-open Nos. 62-201288, 62-201289, 57-66541, 59-124894, 59-203247, 57-11090, 60-44389, 60-71296, 63-1594, 5-38879, and 7-262611, and Japanese Patent Application Publication No. 7-4981). However, these problems are still to be sufficiently solved.

On the other hand, there has been made development of an optical disc having high recording density in accordance with the DVD-ROM standards as a high density optical medium. There have been proposed a system in which use is made of a semiconductor laser with a wavelength of about 600 to 680 nm, that is shorter than the wavelength used for currently prevailing CDs, and a decreased beam spot diameter. In order to develop dye materials for DVD-ROMs, there have been made various attempts to improve the cyanine dyes represented by general formula (III) for CDs and proposals for shorter wavelength cyanine dyes (For example, (Japanese Patent Application Laid-open Nos. 6-199045, 7-186530, 8-306074, 5-38879, 6-40162, etc.).

However, various problems are still to be solved. For example, the recording layer does not have a sensitivity nor film stability corresponding to a desired wavelength so that when a high density medium is fabricated, there occur thermal interference between adjacent pits and other undesirable phenomena, which cause decreases in S/N ratio and C/N ratio and an increase in jitter component in a readout signal.

SUMMARY OF THE INVENTION

Under these circumstances, the present invention has been accomplished, and an object of the present invention is to provide an optical recording medium in accordance with the DVD-ROM standards, which is applicable to short wavelength (500 to 700 nm) semiconductor lasers and has a high stability of its dye film, and which allows the jitter component to decrease particularly when a high density recording is attempted.

The present inventors have intensively studied about various dyes in order to solve the above problems. As a result, the present inventors have found that addition of an aromatic amine compound represented by general formula (I) below as an oxygen quencher to an asymmetric cyanine dye represented by general formula (II) in a proportion of 1 to 30% by weight based on the weight of the dye to compound it will give rise to an organic dye base optical recording medium which is applicable to short waves (500 to 700 nm), has a high sensitivity, reduces readout deterioration, has a long-term reliability, reduces thermal interference between adjacent pits and heat accumulation upon high density recording, and improves C/N ratio and decreases a jitter component contained in a readout signal particularly when a high density recording is attempted. Thus, the present invention has been accomplished based on the above-described discoveries.

According to the present invention, there is provided an optical recording medium comprising:

a substrate which transmits light;

a recording layer formed on a main surface of the substrate; and a metal reflection layer formed on said recording layer; wherein the recording layer is a film which comprises:

an aromatic amine compound represented by general formula (I) below (wherein $R^1$, $R^2$, $R^3$, $R^4$, $R^5$, $R^6$, $R^7$ and $R^8$ independently represent a hydrogen atom or a $C_{1-6}$ alkyl group; $X^-$ represents an anion selected from the group consisting of $I^-$, $Br^-$, $ClO_4^-$, $BF_4^-$, $PF_4^-$, $SbF_4^-$, $CH_3SO_4^-$, and $H_3C$—Ph—$SO_3^-$ where —Ph— is phenylene; and n is an integer of 1 or 2) in a ratio of not smaller than 3% by weight to below 30% by weight based on the total weight of the organic dye thin film, and an asymmetric cyanine dye represented by general formula (II)

(wherein $Z^-$ represents an anion selected from the group consisting of $I^-$, $Br^-$, $ClO_4^-$, $BF_4^-$, $PF_4^-$, $SbF_4CH_3SO_4^-$, $CH_3SO_4^-$ and $H_3C$—Ph—$SO_3^-$; $R^9$ and $R^{10}$ independently represent a $C_{3-18}$ alkenyl group which may have an ester bond or a phenyl group; $Y^1$ and $Y^2$ independently represent a hydrogen atom, an alkyl group, an aryl group, an alkoxy group, a halogen atom, a nitro group, a hydroxyl group, an —$OCF_3$ group, an —$R^{11}OH$ group, —$R^{12}COOR^{13}$ group, —CH=CH—CN group, —$COOR^{14}$ group, or a radical which forms a substituted or unsubstituted naphthalene ring which is condensed with a benzene ring where $R^{11}$ and $R^{12}$ independently represent a $C_{1-9}$ alkylene group and $R^{13}$ and $R^{14}$ independently represent a hydrogen atom or a $C_{1-9}$ alkyl group; n and m are integers of 1 to 4; provided that substituents $(Y^1)n$ and $(Y^2)m$ are not identical to each other in the molecule so that the entire molecular structure is asymmetrical) and showing an optical absorption in a wavelength of 500 to 700 nm in a ratio of not smaller than 70% by weight but below 97% by weight based on the total weight of the organic dye thin film.

Addition of the aromatic amine compound represented by general formula (I) above in a proportion of 1 to 30% by weight, preferably 3 to 15% by weight, based on the weight of the organic dye film, achieves improvement in thermal and chemical stability which is considered to be attributable to inactivation of singlet oxygen which is produced from the aromatic amine compound upon irradiation of light to the recording layer and alleviation of accumulation of thermal energy in the organic dye molecule by absorption of near infrared rays. Further, combined use, with the aromatic amine compound represented by general formula (I) above, of the cyanine dye represented by general formula (II) above, wherein there are two unsaturated bonds in the methylene chain existing in the structural center of the molecule, the nitrogen atom in the indole nucleus on each end of the molecule is bonded to an alkenyl group having 3 to 18 carbon atoms, and the substituents bonding to the two benzene rings of the indole ring or naphthalene rings condensed with the benzene rings have asymmetric structures to each other, can give rise to an optical recording medium having a high sensitivity to read-out/write light having a wavelength of 500 to 700 nm.

The metal reflection layer may be a thin film of a single metal or alloy having higher melting point than that of the recording medium and a light reflectance of 55% or more to short-wavelength laser beam, selected from the group consisting of Al, Au, Ag, Cu, Ni, Ti and chalcogenide metal.

The optical recording medium may be a single-sided optical recording medium obtained by laying a recording layer and a metal reflection layer in sequence on a substrate and further laying a protective layer thereon.

The optical recording medium may be a double-sided optical recording medium obtained by laminating two single-sided optical recording mediums each other via a protective layer, the single-sided optical recording medium being prepared by laying a recording layer and a metal reflection layer in sequence on a substrate and further laying a protective layer thereon.

The optical recording medium may be a double-sided optical recording medium obtained by forming a groove on both surfaces of a substrate as a base upon molding, laying a recording layer and a metal reflection layer in sequence on the both surfaces of the substrate and further laying a protective layer thereon.

According to the present invention, the aromatic amine compound represented by general formula (I) above is added to asymmetric cyanine dye represented by general formula (II) in a proportion of not smaller than 3% by weight to below 30% by weight based on the total weight of the film to form a compounded film and the compounded film is used as a recording layer of an optical recording medium. This prevents deterioration of the cyanine dye by light and increases thermal and chemical stability of the recording layer. As a result, an optical recording medium can be realized which has a sufficient sensitivity and reflectance for readout/writing operations by a semiconductor laser having an oscillation wavelength in 500 to 700 nm and which is excellent in a resistance to readout deterioration, a long-term storage stability, and a reliability. Further, according to the present invention, there is obtained an optical recording medium in compliance with the DVD-ROM standards which avoids thermal interference between adjacent recording pits and heat accumulation when high density recording is attempted, has an improved C/N ratio, and allows high density recording. Further, the optical recording medium of the present invention includes a metal reflection layer made of a metal selected from the group consisting of Al, Au, Ag, Cu, Ni, Ti and chalcogenide metal or alloys thereof, so that a high light reflectance e.g., 55% or more, to short-wavelength laser beam in a range of 500 to 700 nm.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
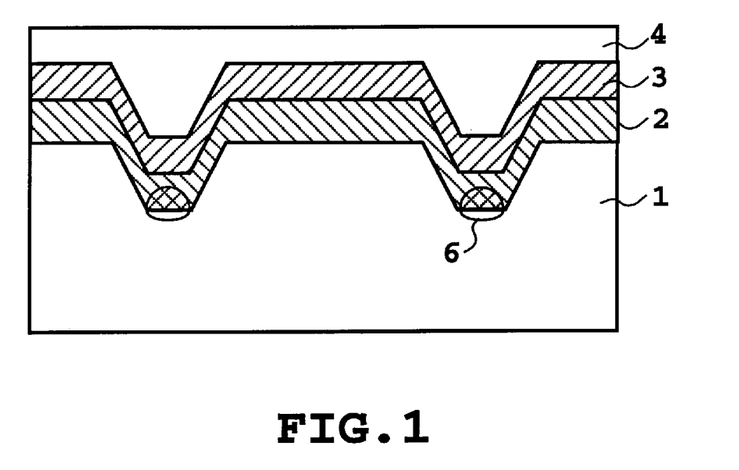
FIG. 1 is a schematic cross sectional view showing a single-sided optical recording medium as one embodiment of the present invention.
Figure 2:
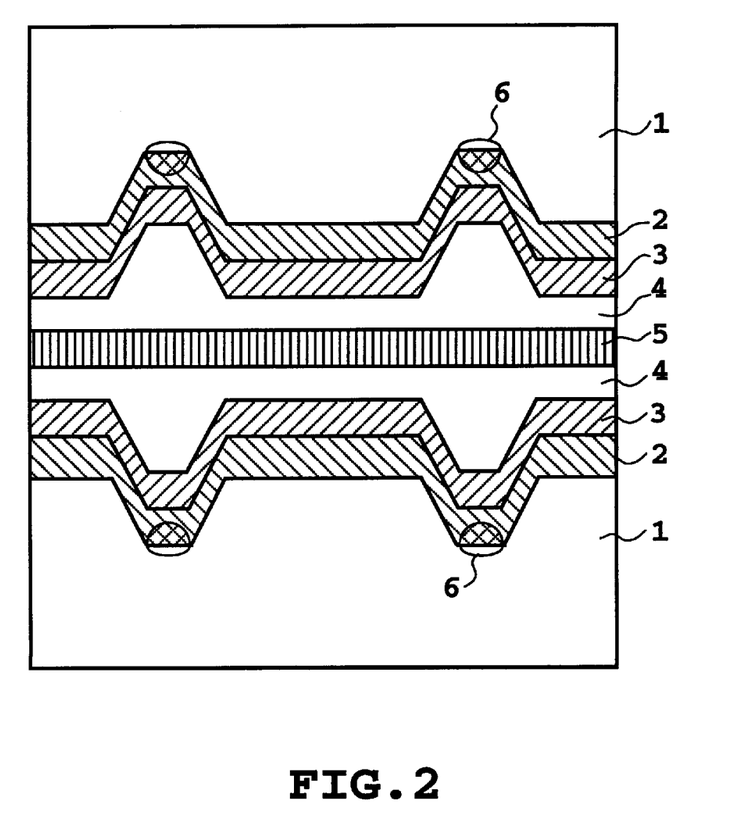
FIG. 2 is a schematic cross sectional view showing a laminate-type optical recording medium as another embodiment of the present invention.
Figure 3:
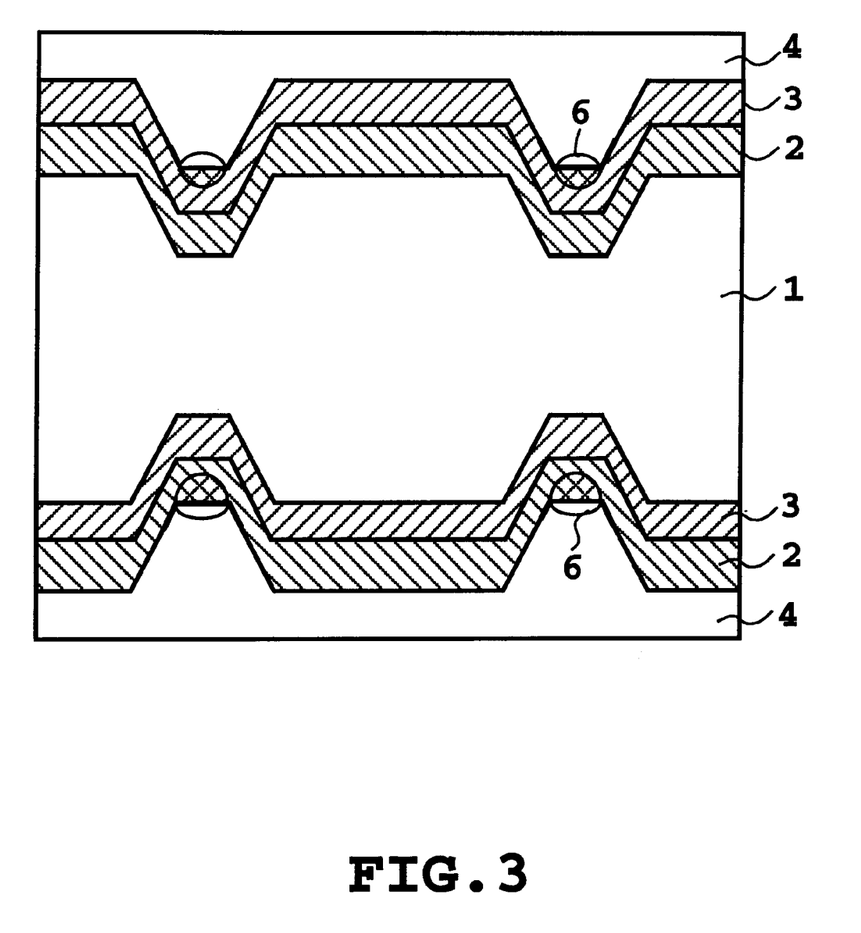
FIG. 3 is a schematic cross sectional view showing a double-sided optical recording medium as still another embodiment of the present invention.

The present invention will be described in detail with reference to FIGS. 1 to 4. In FIGS. 1 to 3, reference numeral 1 denotes a substrate, 2 is a recording layer, 3 is a metal reflection layer, 4 is a protective layer, 5 is an adhesive layer, and 6 is a deformed layer pit.

The optical recording medium as shown in FIG. 1 is a single-sided optical recording medium, in which one main surface of a substrate 1 is provided with a prepit or pregroove for tracking, and the main surface having this pregroove is coated with a recording layer 2. A metal reflection layer 3 is provided on the recording layer 2 and a protective layer 4 is provided on the metal reflection layer 3. The protective layer 4 may be omitted. The prepit is converted into a deformed layer pit 6 by a writing operation.

An optical recording medium as shown in FIG. 2 is a laminate-type optical recording medium having a structure in which the protective layers of two optical recording mediums shown in FIG. 1 are bonded to each other via the adhesive layer 5.

Referring to FIG. 3, a prepit or pregroove for tracking is formed on both main surfaces of a substrate and a metal reflection layer 3 is provided on each main surface and, furthermore, a recording layer 2 is formed thereon and a protective layer 4 is further provided thereon. In this case, a groove is formed so that the unevenness of the groove on the substrate is the inverse of that of the groove formed on the substrate of the optical recording medium shown in FIG. 1.

The substrate 1 has a disc-shape, and a prepit or pregroove for tracking is formed in a concentric or spiral form on one main surface (single-sided and laminate-type) or two main surfaces (double-sided of the substrate. In such a substrate having a prepit or pregroove, an injection-molded resin is used in view of the productivity and the resin used is preferably one which is substantially transparent (transmittance of laser beam is not less than 85%) to recording light and readout light (semiconductor laser beam of about 500 to 700 nm, particularly 600 to 680 nm).

The thickness of the resulting laminates in FIGS. 1 to 3 is from about 1.0 to 1.5 mm. In case of the laminate-type optical recording medium, those having a thickness of about 0.5 to 0.65 mm are laminated to each other. In case of the double-sided type, a prepit or pregroove is simultaneously molded on two main surfaces.

In all the types of medium structure, the diameter is from about 54 to 120 mm and the resin constituting the substrate is not specifically limited, but thermoplastic resins such as polycarbonate resin, polyacrylic resin, polyester resin, amorphous polyolefin resin, TPX, Arton resin, etc. are used in view of the moldability and light transmission properties.

The track pitch in the substrate 1 is from 0.7 to 1.6 μm. The depth of the groove is utilized for tracking control, retention of information, etc. according to the phase of laser beam, but is from about 50 to 230 nm, preferably from about 70 to 200 nm. When the depth of the groove is too small, the deformation of the groove bottom surface reaches the metal reflection layer 3 so that distortion of a readout signal is liable to be induced, thereby causing an increase in jitter and a decrease in modulation factor. On the other hand, when the depth of the groove is too large, the deformation amount of the groove bottom surface of the recording mark portion becomes unstable and the jitter increases. The increase in jitter cause the wavelength-dependence of the readout signal and tracking signal to increase. Accordingly, it is necessary to optimize the depth and shape of grooves as well as spectral characteristics of the recording layer 2 and the like with respect to the wavelength of the semiconductor laser beam to be used in high density recording.

The recording layer 2 formed on one main surface of the substrate 1 is made of a composite organic dye thin film which comprises the aromatic amine compound represented by general formula (I) above and the asymmetric cyanine dye represented by general formula (II) above. The aromatic amine compound used in the present invention, when formed as a thin film together with the cyanine dye, shows an optical absorption of 800 to 1,500 nm in the form of a thin film, thus absorbing radiations in the infrared region serving as heat source. Use of the asymmetric cyanine dye in the film formation of the recording medium in the present invention gives rise to a uniform amorphous thin film without defects, thus increasing thermal and chemical stability in structure of the recording layer.

In general formula (I) above, the substituent groups $R^1$, $R^2$, $R^3$, $R^4$, $R^5$, $R^6$, $R^7$ and $R^8$, which may be different or the same, independently represent a hydrogen atom or a $C_{1-6}$ alkyl group. Particularly preferred substituent groups $R^1$, $R^2$, $R^3$, $R^4$, $R^5$, $R^6$, $R^7$ and $R^8$ include a methyl group, an ethyl group, a propyl group, an isopropyl group, an n-butyl group, a sec-butyl group, a t-butyl group, an n-pentyl group, an n-hexyl group, etc. The "n" in general formula (I) is 1 or 2. The compounds embraced by general formula (I) above can be prepared by a known method. Tables 1 and 2 show specific examples of the compounds of general formula (I) above.

TABLE 1

(Ia)

| Formula No. | Structure of Substituents $R^1$~$R^8$ | Anion X— |
|---|---|---|
| I-1 | $CH_3$ | $ClO_4$— |
| I-2 | $C_2H_5$ | $ClO_4$— |
| I-3 | n-$C_3H_7$ | $ClO_4$— |
| I-4 | i-$C_3H_7$ | $ClO_4$— |
| I-5 | n-$C_4H_9$ | $ClO_4$— |
| I-6 | i-$C_4H_9$ | $ClO_4$— |
| I-7 | t-$C_4H_9$ | $ClO_4$— |
| I-8 | n-$C_5H_{11}$ | $ClO_4$— |
| I-9 | $CH_3$ | $BF_4$— |
| I-10 | $C_2H_5$ | $BF_4$— |
| I-11 | n-$C_3H_7$ | $BF_4$— |
| I-12 | i-$C_3H_7$ | $BF_4$— |
| I-13 | n-$C_4H_9$ | $BF_4$— |
| I-14 | i-$C_4H_9$ | $BF_4$— |
| I-15 | t-$C_4H_9$ | $BF_4$— |
| I-16 | n-$C_5H_{11}$ | $BF_4$— |
| I-17 | $CH_3$ | $SbF_4$— |
| I-18 | $C_2H_5$ | $SbF_4$— |
| I-19 | n-$C_3H_7$ | $SbF_4$— |
| I-20 | i-$C_3H_7$ | $SbF_4$— |
| I-21 | n-$C_4H_9$ | $SbF_4$— |
| I-22 | i-$C_4H_9$ | $SbF_4$— |
| I-23 | t-$C_4H_9$ | $SbF_4$— |
| I-24 | n-$C_5H_{11}$ | $SbF_4$— |

TABLE 2

(Ib)

| Formula No. | Structure of Substituents $R^1$~$R^8$ | Anion X— |
|---|---|---|
| I-25 | $CH_3$ | $ClO_4$— |
| I-26 | $C_2H_5$ | $ClO_4$— |
| I-27 | n-$C_3H_7$ | $ClO_4$— |

TABLE 2-continued (Ib)

[Structure showing aromatic amine compound with R¹-N(R²), R³-N-R⁴, R⁸-N(R⁷), N-R⁵/R⁶ substituents on biphenyl-bis(aniline) core] X⁻

| Formula No. | Structure of Substituents R¹–R⁸ | Anion X— |
|---|---|---|
| I-28 | i-C₃H₇ | ClO₄— |
| I-29 | n-C₄H₉ | ClO₄— |
| I-30 | i-C₄H₉ | ClO₄— |
| I-31 | t-C₄H₉ | ClO₄— |
| I-32 | n-C₅H₁₁ | ClO₄— |
| I-33 | CH₃ | BF₄— |
| I-34 | C₂H₅ | BF₄— |
| I-35 | n-C₃H₇ | BF₄— |
| I-36 | i-C₃H₇ | BF₄— |
| I-37 | n-C₄H₉ | BF₄— |
| I-38 | i-C₄H₉ | BF₄— |
| I-39 | t-C₄H₉ | BF₄— |
| I-40 | n-C₅H₁₁ | BF₄— |
| I-41 | CH₃ | SbF₄— |
| I-42 | C₂H₅ | SbF₄— |
| I-43 | n-C₃H₇ | SbF₄— |
| I-44 | i-C₃H₇ | SbF₄— |
| I-45 | n-C₄H₉ | SbF₄— |
| I-46 | i-C₄H₉ | SbF₄— |
| I-47 | t-C₄H₉ | SbF₄— |
| I-48 | n-C₅H₁₁ | SbF₄— |

The recording layer 2 contains the aromatic amine compound represented by general formula (I) in a proportion of not smaller than 3% by weight to below 30% by weight, preferably not smaller than 3% by weight to not greater than 15% by weight, based on the total weight of the thin film. If the proportion of the aromatic amine compound is below 3% by weight based on the total weight of the thin film, the thermal and chemical stability of the recording layer cannot be increased sufficiently. On the other hand, if the proportion of the dye is not smaller than 30% by weight based on the total weight of the thin film, the proportion of the cyanine dye becomes too small, resulting in an insufficient sensitivity and in addition there tends to occur phase separation between a phase composed mainly of the aromatic amine compound and a phase composed mainly of the cyanine dye in the recording layer 2. Therefore, the proportion of the aromatic amine compound must be optimized in the ranges of not smaller than 3% by weight to below 30% by weight, preferably not smaller than 3% by weight to not greater than 15% by weight, based on the total weight of the thin film depending on the structure of the cyanine dye to be used.

All of the cyanine dyes represented by general formula (II) above have absorption and reflectance wavelengths at 500 to 700 nm and have sufficient writing/readout sensitivity to the laser wavelength (600 to 680 nm) after forming into a thin film.

$R^9$ and $R^{10}$ in general formula (II) above may be unsaturated bond-containing groups such as an allyl group, a vinyl group, an allylidene group, an allyloxy group, a crotonoyl group, a styryl group, a vinylidene group, a vinylene group, a methylidyne group, an acryloxy group, a methacryloxy group, an isopropenyl group, an ethynyl group, a butenyl group, etc. These substituent groups are superior in film forming property and affinity with the surface of the substrate of the dye. The number of carbon atoms is from 3 to 18, and preferably from about 3 to 9. Introduction of the substituents $R^9$ and $R^{10}$ and asymmetric introduction of $Y^1$ and $Y^2$ can prevent agglomeration, association or the like undesirable phenomena of the dye molecules. By the effects described above, there can be obtained a recording film (recording layer 2) having excellent film-forming property and reliability. The cyanine dyes represented by general formula (II) above can be prepared referring to the known methods of synthesis as described in U. S. Pat. Nos. 2,734,900, 2,112,139, and 2,887,479, the disclosures of which are incorporated herein by reference.

Specific examples (II-1 to II-27) of the cyanine dyes represented by general formula above are illustrated below.

(II-1)

(II-2)

(II-3)

(II-4)

(II-5)

(II-6)

(II-7)

(II-8)

(II-9)

(II-10)

(II-11)

(II-15)

(II-12)

(II-16)

(II-17)

(II-13)

(II-18)

(II-14)

(II-19)

(II-20)

(II-23)

(II-21)

(II-24)

(II-22)

(II-25)

(II-26)

-continued (II-27)

The recording layer 2 may contain an oxygen quencher (photostabilizer) in an amount of 1% or more, preferably 1 to 20% (more preferably 3 to 20%), together with the cyanine dye. This oxygen quencher scavenges a radical generated as a result of deterioration of the cyanine dye caused by ultraviolet ray, laser beam, etc., thereby terminating the chain reaction. It improves the photostability and prevents discoloration due to readout light, particularly. Thus, this recording layer can improve the long-term storage properties and inhibit flow of the film caused by heat generation. Specific examples of the oxygen quencher used, together with the above dye, include the followings.

The cyanine dyes represented by general formula (II) above together with the aromatic amine compounds represented by general formula (I) above and optionally the above-described quencher may be dissolved in a solvent for coating which does not attack the substrate 1, for example, methylcellosolve, ethylcellosolve, methanol, ethanol, isopropanol, diacetone alcohol, dimethylformamide, cyclohexanone, acetyl acetone, tetrafluoropropanol, dichloroethane, dioxane or the like. The resulting solution may be provided generally by spin-coating on a surface of the substrate 1 made of the above-described resin and provided with a groove.

The thickness of the recording layer 2 is from about 50 to 500 nm, preferably from about 50 to 300 nm. If the thickness is smaller than 50 nm, the recording sensitivity and film stability are insufficient and an ideal recording cannot be performed. On the other hand, if this value exceeds 300 nm, it may become impossible to obtain a tracking signal and overlap of pits may arise. Therefore, jitter tends to increase and distortion of the waveform of the readout signal is liable to occur, thereby causing cross talk. It is advisable that the film thickness be controlled taking into consideration the film forming conditions, dye concentration and groove shape.

The metal reflection layer 3 is a thin film of a metal having a light reflectance of 50% or more, preferably 60% or more, to a laser beam for readout and having a melting point higher than that of the recording layer 2, selected from Al, Au, Ag, Cu, Ni, Ti and chalcogenide metal or alloys thereof. The thin film has a film thickness of 30 to 150 nm, preferably about 50 to 100 nm. As a method of forming this thin film, there can be used a sputtering method, a vacuum deposition method, an ion plating method and the like.

The protective layer 4 is generally formed by applying an ultraviolet-curing resin using a spin coating method, a spray coating method, a gravure coating method, etc., and irradiating ultraviolet ray to cure the coated film. In addition, an epoxy resin, an acrylic resin and a silicone resin may also be used. Further, the protective layer may be formed by applying a sheet-shaped resin. The double-sided protective layer 4 may be the above protective layer, or an inorganic film (e.g. SiO, $SiO_2$, etc.) may be formed by a sputtering method or a deposition method. It may also be a polymer film obtained by polymerizing or plasma polymerization, a resin such as Parylene, polyamide, polyimide, etc., using a method such as deposition, plasma, polymerization, etc. The film thickness is from about 0.5 to 50 μm.

The laminate-type optical recording medium as shown in FIG. 2 is obtained by bonding two single-sided optical recording mediums using an adhesive layer 5 such as a hot-melt type adhesive, an ultraviolet/visible-curing type adhesive or an adhesive tape, and is used as a high-density optical recording medium which is capable of double-sided recording/readout. The protective layer and adhesive layer may be used in combination.

EXAMPLES

The following examples further illustrate the present invention in detail but are not to be construed to limit the scope thereof.

In the examples and comparative examples below, there was used a 0.6 mm thick polycarbonate substrate with a track pitch of groove of 0.75 μm.

Example 1

Powder consisting of a 9:1 (by weight) mixture of the cyanine dye represented by the chemical formula (II-2) and the aromatic amine compound represented by the chemical formula (I-5) as a solute was sufficiently dissolved in a 5:3:2 (by weight) mixed solvent of ethylcellosolve/ethanol/diacetone alcohol in a concentration of 2% by weight of the solute, using an ultrasonic wave. After filtered with a filter, the resulting solution was applied on the above substrate by using a spin coating method to obtain a uniform recording layer having a thickness of about 60 nm. Subsequently, an Al film having a thickness of 70 nm was formed by a sputtering method to obtain a metal reflection layer. Furthermore, a polyfunctional epoxy acrylate ultraviolet-curing paint was applied to the metal reflection layer by a spin coating method and then cured to obtain a protective layer. The protective layer was about 6 μm thick. Thus, a single-sided optical recording medium was obtained.

To obtain a laminate-type optical recording medium, the respective opposed protective layers of two single-sided optical recording mediums were laminated to each other by heat bonding with a hot-melt type adhesive to prepare a desired optical recording medium.

Example 2

An optical recording medium was fabricated in the same manner as in Example 1, except that in stead of the aromatic amine compound represented by the chemical formula (I-5), the aromatic amine compound represented by the chemical formula (I-13) was used.

Example 3

An optical recording medium was fabricated in the same manner as in Example 1, except that instead of the cyanine d ye represented by the chemical formula (II-2), the cyanine dye represented by the chemical formula (II-13) was used.

Example 4

An optical recording medium was fabricated in the same manner as in Example 1, except that instead of the cyanine dye represented by the chemical formula (II-2) alone, a 1:1 (by weight) mixture of the cyanine dyes represented by the chemical formulae (II-13) and (II-2) was used.

Comparative Example 1

An optical recording medium was fabricated in the same manner as in Example 1, except that the aromatic amine compound represented by the chemical formula (I-5) was not used.

Comparative Example 2

An optical recording medium was fabricated in the same manner as in Example 4, except that the aromatic amine compound represented by the chemical formula (I-5) was not used.

Comparative Example 3

An optical recording medium was fabricated in the same manner as in Example 1, except that instead of the aromatic amine compound represented by the chemical formula (I-5), an Ni complex represented by chemical formula (III-1) below (III-1)

(NKX-1199, manufactured by Nippon Kanko Shikiso Co., Ltd.) was used.

Comparative Example 4

An optical recording medium was fabricated in the same manner as in Example 1, except that instead of the cyanine dye represented by the chemical formula (II-2), there was used a cyanine dye having a symmetrical molecular structure represented by the chemical formula (IV-1) below (IV-1)

as a major component.

Comparative Example 5

An optical recording medium was fabricated in the same manner as in Example 1, except that the solute was substituted by powder of a 9.8:0.2 (by weight) mixture of the cyanine dye represented by the chemical formula (II-2) and the aromatic amine compound represented by the chemical formula (I-5).

Comparative Example 6

An optical recording medium was fabricated in the same manner as in Example 1, except that the solute was substituted by powder of a 7:3 (by weight) mixture of the cyanine dye represented by the chemical formula (II-2) and the aromatic amine compound represented by the chemical formula (I-5).

Tests

The light reflectance and readout signal characteristics (C/N ratio, jitter, and error rate) of the resulting optical recording mediums in the above-described examples and comparative examples were measured. The readout signal characteristics were evaluated by using an evaluation device after light condensation was performed using an objective lens with the numerical aperture (NA) of the objective lens of 0.60 using semiconductor laser beam of a wavelength of 635 nm so that the light can be condensed to a spot diameter of about 0.8 $\mu$m at a linear disk rate of 3.3 m/sec and recording was performed by writing power of 7 mW. There were performed measurements of the initial characteristics, those after the readout deterioration characteristics tests (after readout of $1 \times 10^4$ times) and those after the accelerated light resistance tests(after 50 hours' exposure to radiation from a 1500 W metal halide lamp such that energy density on the surface of the medium was 30 mW/cm$^2$). In addition, in order to evaluate the photochemical stability of the recording layer, a sample was fabricated which had only a recording layer of about 60 nm on the polycarbonate substrate and the sample was exposed to light under the same conditions as the above-described accelerated light resistance tests, followed by examination of time-dependent change in decrement of optical absorbance of the recording layer at its optimal absorption.

For all the optical recording mediums fabricated, the initial characteristics showed a reflectance of 55% or higher, a C/N ratio of 52 dB or more, and an error-rate of $1 \times 10^{-5}$ or lower. However, the recording layers fabricated by the methods used in Examples 1 to 4 had a half life of optical absorbance of 50 hours or longer under the above-described accelerated light resistance tests, thus exhibiting photochemical stability, whereas those recording layers fabricated by the methods described in Comparative Examples 1 to 4 had a half life of about 20 hours, which indicated that photo-deterioration tended to proceed. In Comparative Example 5, the amount of the aromatic amine compound added was insufficient and, hence, no sufficient stability of the recording layer was achieved. In Comparative Example 6, there was observed failure of readout signal characteristics which is considered to be attributable to phase separation of the aromatic amine compound.

Both acceptable writing/readout characteristics and photochemical and thermal stabilities were achieved only when the aromatic amine compound represented by general formula (I) and the asymmetric cyanine dye represented by general formula (II) above are compounded in a specified proportion. Relative variation in characteristics after.

Figure 4:
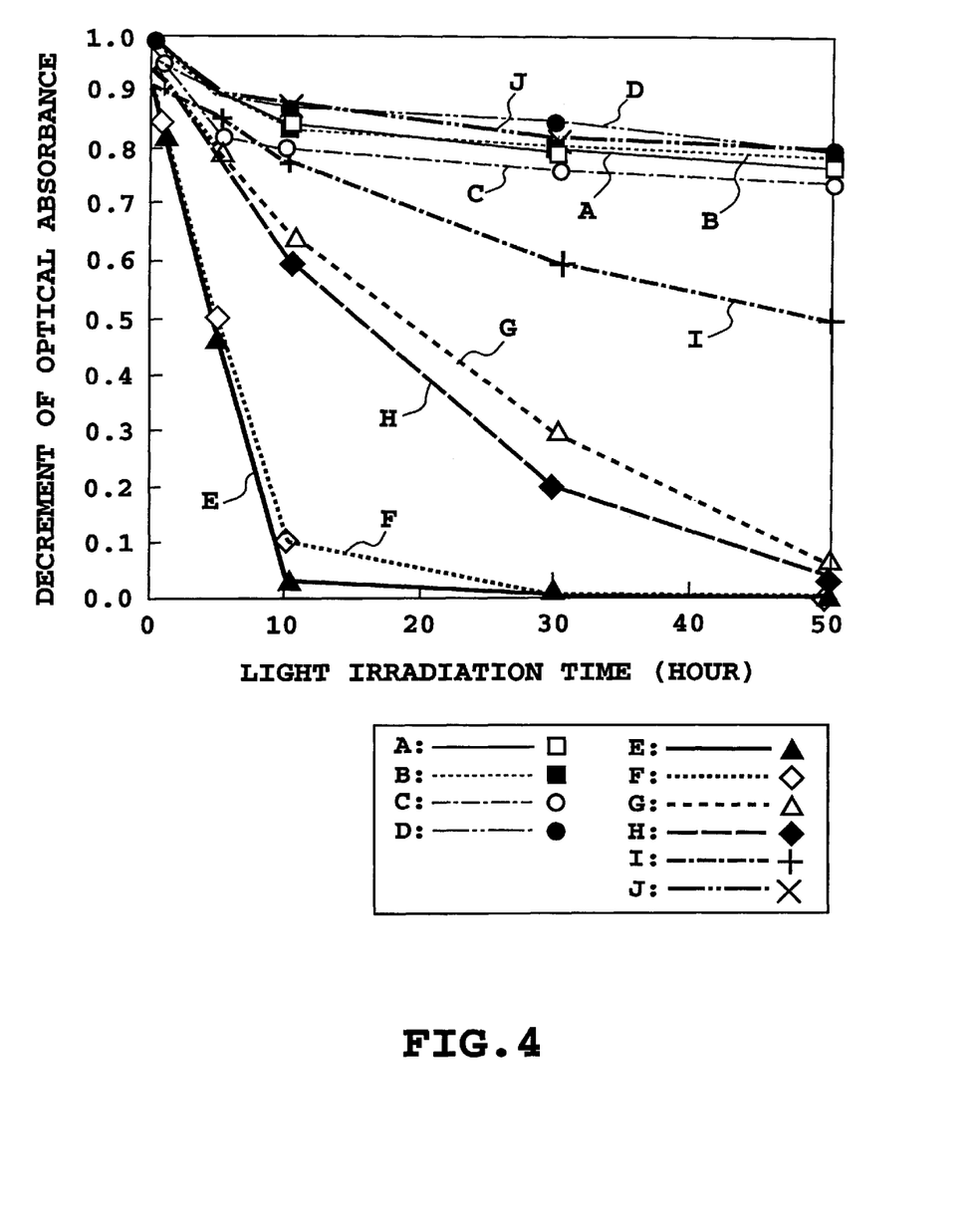
FIG. 4 is a graph illustrating a relationship between light irradiation time and decrement of optical absorbance.

Tables 3 and 4 below show % changes in characteristics after readout deterioration and after high-temperature/high-humidity test with respect to the initial characteristics. FIG. 4 illustrates a relationship between light irradiation time and decrement of optical absorbance at the $\lambda_{max}$ of the recording film. In FIG. 4, symbols A through J indicate curves relative to Examples 1 to 4 and Comparative Examples 1 to 6, respectively.

TABLE 3

% Change in characteristics after repeating readout $1 \times 10^4$ times

|  | Reflectance | C/N | Error Rate |
|---|---|---|---|
| Example 1 | 5 | 6 | 8 |
| Example 2 | 7 | 3 | 7 |
| Example 3 | 6 | 3 | 8 |
| Example 4 | 3 | 2 | 7 |
| Comparative Example 1 | Not Measurable | Not Measurable | Not Measurable |
| Comparative Example 2 | 50 | 80 | 30 |
| Comparative Example 3 | 45 | 30 | 20 |
| Comparative Example 4 | 20 | 40 | 30 |
| Comparative Example 5 | 50 | 20 | 15 |
| Comparative Example 6 | 10 | 40 | 30 |

TABLE 4

% Change in characteristics after 30 hours' irradiation

|  | Reflectance | C/N | Error Rate |
|---|---|---|---|
| Example 1 | 15 | 12 | 18 |
| Example 2 | 17 | 15 | 17 |
| Example 3 | 16 | 13 | 18 |
| Example 4 | 13 | 10 | 17 |
| Comparative Example 1 | 90 | Not Measurable | Not Measurable |
| Comparative Example 2 | 60 | 85 | 50 |
| Comparative Example 3 | 30 | 45 | 30 |
| Comparative Example 4 | 40 | 50 | 35 |
| Comparative Example 5 | 25 | 20 | 25 |
| Comparative Example 6 | 10 | 50 | 35 |

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical recording medium comprising:

a substrate which transmits light;

a recording layer formed on a main surface of the substrate; and a metal reflection layer formed on the recording layer;

wherein the recording layer is a thin film comprised of organic dye which comprises:

a. an aromatic amine compound represented by general formula (I):

wherein:
$R^1$, $R^2$, $R^3$, $R^4$, $R^5$, $R^6$, $R^7$ and $R^8$ independently represent a hydrogen atom or a $C_{1-6}$ alkyl group;

$X^-$ represents an anion selected from the group consisting of $I^-$, $Br^-$, $ClO^4$, $BF_4^-$, $PF_4^-$, $SbF_4^-$, $CH_3SO_4^-$, and $H_3C$—Ph—$SO_3^-$ in which —Ph— is phenylene; and n is an integer of 1 or 2, present in an amount ranging from at least 3% up to but less than 30% by weight based on total weight of the thin film, and b. an asymmetric cyanine dye represented by general formula (II):

wherein:
$Z^-$ represents an anion selected from the group consisting of $I^-$, $Br^-$, $ClO_4^-$, $BF_4^-$, $PF_4^-$, $SbF_4^-$, $CH_3SO_4^-$, and $H_3C$—Ph—$SO_3^-$ in which —Ph— is phenylene;

$R^9$ and $R^{10}$ independently represent a $C_{3-18}$ alkenyl group which may have an ester bond or a phenyl group;

$Y^1$ and $Y^2$ independently represent a hydrogen atom, an alkyl group, an aryl group, an alkoxy group, a halogen atom, a nitro group a hydroxyl group, an —$OCF_3$ group, an —$R^{11}OH$ group, —$R^{12}COOR^{13}$ group, —CH=CH—SN group, —$COOR^{14}$ group, or a radical which forms a substituted or unsubstituted naphthalene ring which is condensed with a benzene ring, where $R^{11}$ and $R^{12}$ independently represent a $C_{1-9}$ alkylene group, and $R^{13}$ and $R^{14}$ independently represent a hydrogen atom or a $C_{1-9}$ alkyl group;

n and m are integers of 1 to 4;

provided that substituents $(Y^1)_n$ and $(Y^2)_m$ are not identical to each other in the molecule so that the entire molecular structure is asymmetrical and shows an optical absorption in a wavelength range of from 500 to 700 nm, present in an amount ranging from 70% up to but less than 97% by weight based on total weight of the thin film.

2. The optical recording medium as claim in claim 1, wherein the metal reflection layer is one of:

(a) a thin film which is comprised of a single metal or (b) an alloy which is comprised of a plurality of metals which have a melting point which exceeds that of the optical recording medium and a light reflectance of at least 55% for a short-wavelength laser beam having a wavelength ranging from 500 to 700 nm, and
wherein the metal reflection layer is comprised of at least one material selected from the group consisting of Al, Au, Ag, Cu, Ni, Ti, and a chalcogenide.

3. The optical recording medium as claimed in claim 1, wherein the optical recording media is a single-sided optical recording medium comprised of the substrate, the recording layer formed on the substrate, and the metal reflection layer formed on the recording layer, and wherein the single-sided optical recording medium has a protective layer provided on the metal reflection layer.

4. The optical recording medium as claimed in claim 1, wherein the optical recording media is a double-sided optical recording medium comprised of two single-sided optical recording medium which are bonded together and which each comprise a substrate, a recording layer formed on the substrate, and a metal reflection layer formed on the recording layer, and wherein the two single-sided optical recording medium are bonded together by a protective layer provided on at least one of the metal reflection layers.

5. The optical recording medium as claimed in claim 4, wherein the metal reflection layers of each of the single-sided optical recording medium have a protective layer provided thereon, and wherein the optical recording medium further comprises an adhesive layer provided between the respective protection layers.

6. The optical recording medium as claimed in claim 1, wherein the optical recording medium is a double-sided optical recording medium comprising a single substrate having two surfaces each of which is grooved, a recording layer formed on each of the two surfaces of the substrate, a metal reflection layer formed on each of recording layer, and a protective layer formed on each metal reflection layer.

7. The optical recording medium as claimed in claim 1, wherein the recording layer contains an oxygen quencher in an amount of 1% by weight or more.

* * * * *